US005996840A

United States Patent [19]

Serduke

[11] Patent Number: 5,996,840

[45] Date of Patent: Dec. 7, 1999

[54] NEWSPAPER AND MAGAZINE DISPENSING MACHINE

[76] Inventor: Gregory M. Serduke, 104 N. Ashland, La Grange, Ill. 60525

[21] Appl. No.: 08/535,708

[22] Filed: Sep. 28, 1995

[51] Int. Cl.[6] ....................................................... B23Q 7/04

[52] U.S. Cl. .......................... 221/210; 221/213; 221/151

[58] Field of Search .................................... 221/210, 220, 221/219, 151, 152, 213; 271/85, 18, 19; 414/796.9

[56] References Cited

U.S. PATENT DOCUMENTS

| | | | |
|---|---|---|---|
| 1,273,437 | 7/1918 | Wilmore | 221/213 |
| 1,285,187 | 11/1918 | Hotaling | 221/213 |
| 1,621,960 | 3/1927 | Stewart et al. | 221/213 |
| 2,576,636 | 11/1951 | Opgenorth | 221/213 |
| 2,819,817 | 1/1958 | Mackenzie et al. | 221/213 |
| 2,854,168 | 9/1958 | Abrams et al. | 221/213 |
| 2,896,820 | 7/1959 | Clark et al. | 221/210 |
| 2,926,814 | 3/1960 | Utiger | 221/213 |
| 3,042,172 | 7/1962 | Bowlby | 221/210 |
| 3,136,451 | 6/1964 | Deane | 221/240 |
| 5,363,987 | 11/1994 | Crawford et al. | 221/155 |

FOREIGN PATENT DOCUMENTS

| | | | |
|---|---|---|---|
| 139209 | 5/1985 | European Pat. Off. | 221/210 |
| 7711355 | 4/1979 | Netherlands | 221/210 |

*Primary Examiner*—William E. Terrell
*Assistant Examiner*—Khoi H. Tran
*Attorney, Agent, or Firm*—Robert L. Marsh

[57] ABSTRACT

A vending machine suitable for use for vending newspapers and the like, has an enclosure in which there is a magazine for retaining a stack of newspapers, and near the magazine is a chute at the lower end of which is a tray accessible to a customer seeking to purchase one of the items in the machine. A moveable inner arm with a pair of jaws at one end thereof is moveable from a first position to a second position. In one of the two positions the jaws are over the chute such that an item held in the jaws can be released and dropped through the chute. In the other of the two positions, the jaws are against an exposed face of a top item or an end item in the magazine. The inner arm is pivotally mounted on a shaft which extends through the enclosure and connects to a second arm on the exterior of the machine, such that movement of the inner arm may be controlled by moving the exterior arm. The movement of the jaws is controllable by an actuating lever arm on the handle at the end of the exterior arm. The operation of the machine is regulated by a one cycle latch responsive to a coin receptor, the one cycle latch having a latch position in which the inner arm is locked against movement between the first and second position and unlatched position in which the arm is locked against movement.

10 Claims, 7 Drawing Sheets

NEWSPAPER AND MAGAZINE DISPENSING MACHINE

The present invention relates to free standing vending machines for selling bulky products of the type having a coin receptor into which a customer inserts the proper coins to purchase the product such as a magazine or newspaper.

BACKGROUND OF THE INVENTION

A great quantity of products such as newspapers are sold in free standing vending machines. A typical newspaper vending machine has an enclosure into which a stack of newspapers is inserted, a door for access to the stack of newspapers, and a latch on the door which is released upon the insertion of coins in the proper amount into a coin receptor. Unfortunately, however, a customer who has deposited the correct coins into the receptor and has opened the enclosure door, may if he sees fit, remove all the newspapers in the enclosure. The theft of newspapers from such machines is common, but nonetheless, such machines are the most commonly used machines for vending newspapers.

Many existing machines do not have transparent windows enabling a customer to see the product within, and consequently, he may deposit coins into a machine and find that he has lost his money. Furthermore, existing machines are subject to tampering and could easily be used to conceal explosives or poisons which would harm a customer when he opens the enclosure. The risk to the public as a result of tampering is believed to have restricted the use of such machines in recent months.

Efforts have been made to provide a vending machine which will dispense a single newspaper in response to the receipt of the proper coinage in a coin receptor. One example of such machines are Utiger U.S. Pat. No. 2,926,814 in which a rotating claw is used to hook the end copy of a row the newspaper arranged on end, and to flip it to a dispensing chute.

A second example is Deane U.S. Pat. No. 3,136,451 which discloses a machine having an enclosure for receiving a stack of newspapers which are piled upon a moveable tray which removes the lower most newspaper to a dispensing slot upon receipt of proper coins in a coin receptor.

Newspaper dispensing devices, such as shown by Utiger and Deane, have generally been unsuccessful and are infrequently used because the thickness and weight of a newspaper will vary widely from issue to issue, and consequently such machines can not reliable dispense a single copy of a newspaper. As a result, the machine first described which relies upon the trust of the customer remains in wide use. The industry is, therefore, in need of a tamper proof dispensing machine which would reliably dispense a single copy of a newspaper regardless of its thickness and weight.

SUMMARY OF THE INVENTION

Briefly, the present invention is a vending machine suitable for use for vending newspapers and magazines and the like, and in the preferred embodiment, dispenses such newspapers or magazines which are individually wrapped in a flexible wrapping material such as plastic. The device has an enclosure in which there is a magazine suitable for retaining a stack of newspapers, magazines, or any other item having substantially planar opposing faces such that they can be stacked or arranged in face to face relationship to each other with a partially exposed upper face or end face. Positioned near the magazine is a chute at the lower end of which is a tray accessible to a customer seeking to purchase one of the items in the machine. There is also a moveable inner arm with a pair of jaws at one end thereof, and the jaws end is moveable from a first position to a second position. In one of the two positions, the jaws are over the chute such that an item held in the jaws can be released and dropped through the chute. In the other of the two positions, the jaws are against an exposed face of a top item or an end item in the magazine.

The inner arm is pivotally mounted on a shaft which extends through the enclosure and connects to a second arm on the exterior of the machine, such that movement of the inner arm may be controlled by moving the exterior arm. The movement of the jaws is controllable by an actuating lever arm on the handle at the end of the exterior arm.

The operation of the machine is regulated by a one cycle latch having a latch position in which the inner arm is locked against movement between the first and second position and an unlatched position in which the arm is moveable from the first position to the second position and back to the first position after which the one cycle latch is returned to the latched position. The device further has a coin receptor, or other means for receiving the customer's payment for an item to be dispensed. The one cycle latch is connected to the receptor and moved from the latch position to the unlatched position upon the deposit of the proper coins or the like into the receptor.

To operate the machine, a customer first deposits the proper coinage into the receptor after which the one cycle latch permits movement of the arms through one cycle. In the preferred embodiment the arms are vertical with the jaws positioned over the chute when the arms are in the standby position. After the one cycle latch is moved to the unlatched position a customer will manipulate the exterior arm to move the jaws against the exposed face of the upper item in the magazine. Next he will squeeze the lever arm on the handle to close the jaws and grasp the plastic wrapper of the top item, and with the item in the jaws, move the arm back to the first position over the chute. Opening the jaws allows the item to fall through the chute to the tray at the bottom thereof, where it can be removed by the customer.

In the preferred embodiment the items in the magazine are in stacked relationship with the face of the uppermost item positioned substantially horizontally. In a second embodiment of the invention, the items are positioned on end, that is in side by side relationship with the faces substantially vertical. When the magazine retains the items in this configuration the jaws are moveable from a position over the chute to a position against a partially exposed face of an end item. The jaws may then be closed to grasp the end item and move it to the chute.

GENERAL DESCRIPTION OF THE DRAWINGS

Further objects and advantages and a better understanding of the present invention will be had by reference to the following detailed description taken in conjunction with the accompanying drawings, wherein;

FIG. 1 is a front elevational view of a dispensing machine in accordance with the present invention showing the outer arm in solid lines in the dispensing position, and in phantom lines in the grasping position;

FIG. 2 is a cross sectional view of the machine shown in FIG. 1 showing the arm in solid lines in the dispensing position and in broken lines in the grasping position; taken through lines 2—2 as seen in FIG. 1; and FIG. 3 is a cross-sectional view of the machine shown in FIG. 1 taken through line 3—3 as seen in FIG. 2; showing the jaws and arms in the dispensing position in solid lines and in the grasping position in phantom lines;

DETAILED DESCRIPTION OF A PREFERRED EMBODIMENT

Figure 1:
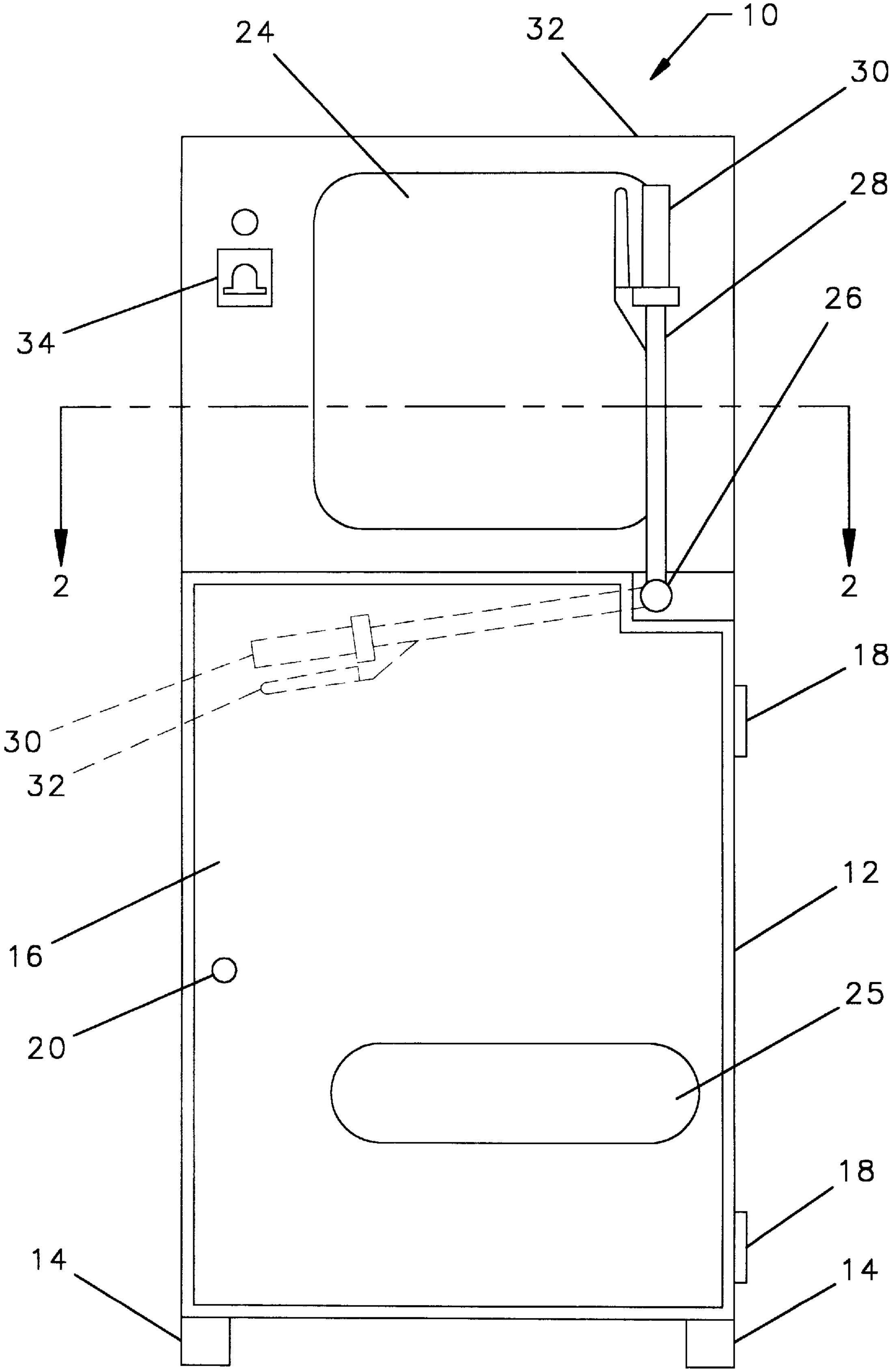

Referring to FIG. 1, a machine 10 suitable for dispensing newspapers and the like has an enclosure 12 and is supported on a plurality of feet 14. The enclosure 12 has a door 16 on hinges 18, which can be locked closed by a conventional key lock 20, such that a stack of newspapers may be loaded into the machine 10 through the door 16. Centrally located in the enclosure over the door 16 is a plexiglass window 24 through which a customer can view the operation of the machine to see that a newspaper therein is being properly dispensed. Below the door 16 is a dispensing slot 25 through which a customer can withdraw an item dispensed by the machine 10.

Extending through the front of the enclosure 12 is a tubular shaft 26 and mounted on the shaft 26 is an exterior arm 28 at the distal end of which is a handle 30 and a lever arm 32. At one corner of the enclosure 12 is a coin receptor 34 of the type well known in the art for receiving coins deposited therein to purchase a newspaper.

Figure 3:
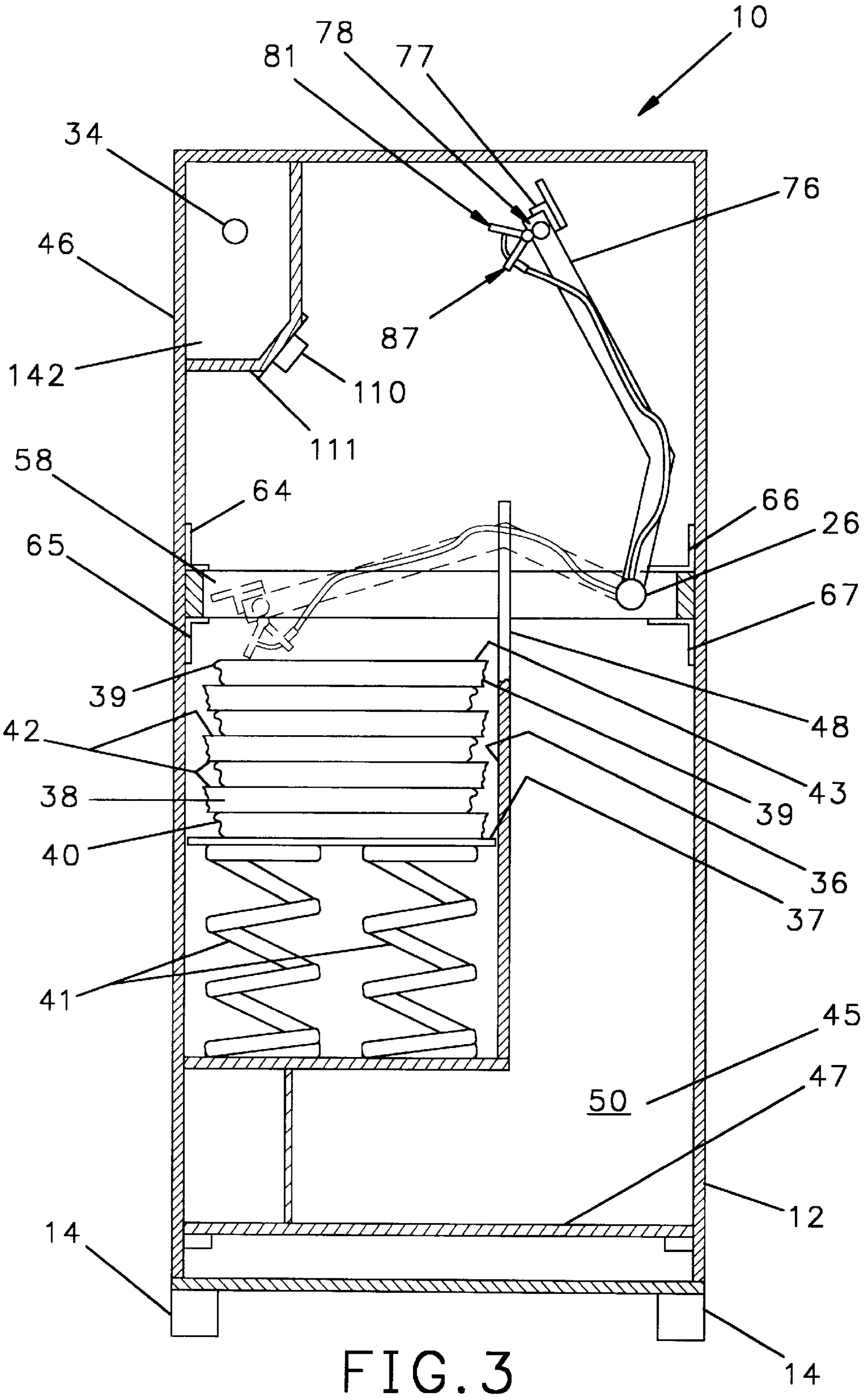

Referring to FIG. 3, along one side of the enclosure 12 is a magazine 36 suitable for retaining a stack of newspapers 38, each of which is individually wrapped in a plastic or other suitable wrapping material 40. The newspapers 38 are positioned on a vertically slidable platform 37 supported by a plurality of springs 41. The compression of the springs 41 is proportional to the weight of the newspapers on the platform 37 such that the upper newspaper 39 is always accessible to the inner arms as described below. Although the machine is depicted as dispensing newspapers, it can be used to dispense any item having substantially planar opposing faces 42—42 so that the items can be positioned in face to face relationship with the upper most face 43 exposed.

Figure 2:
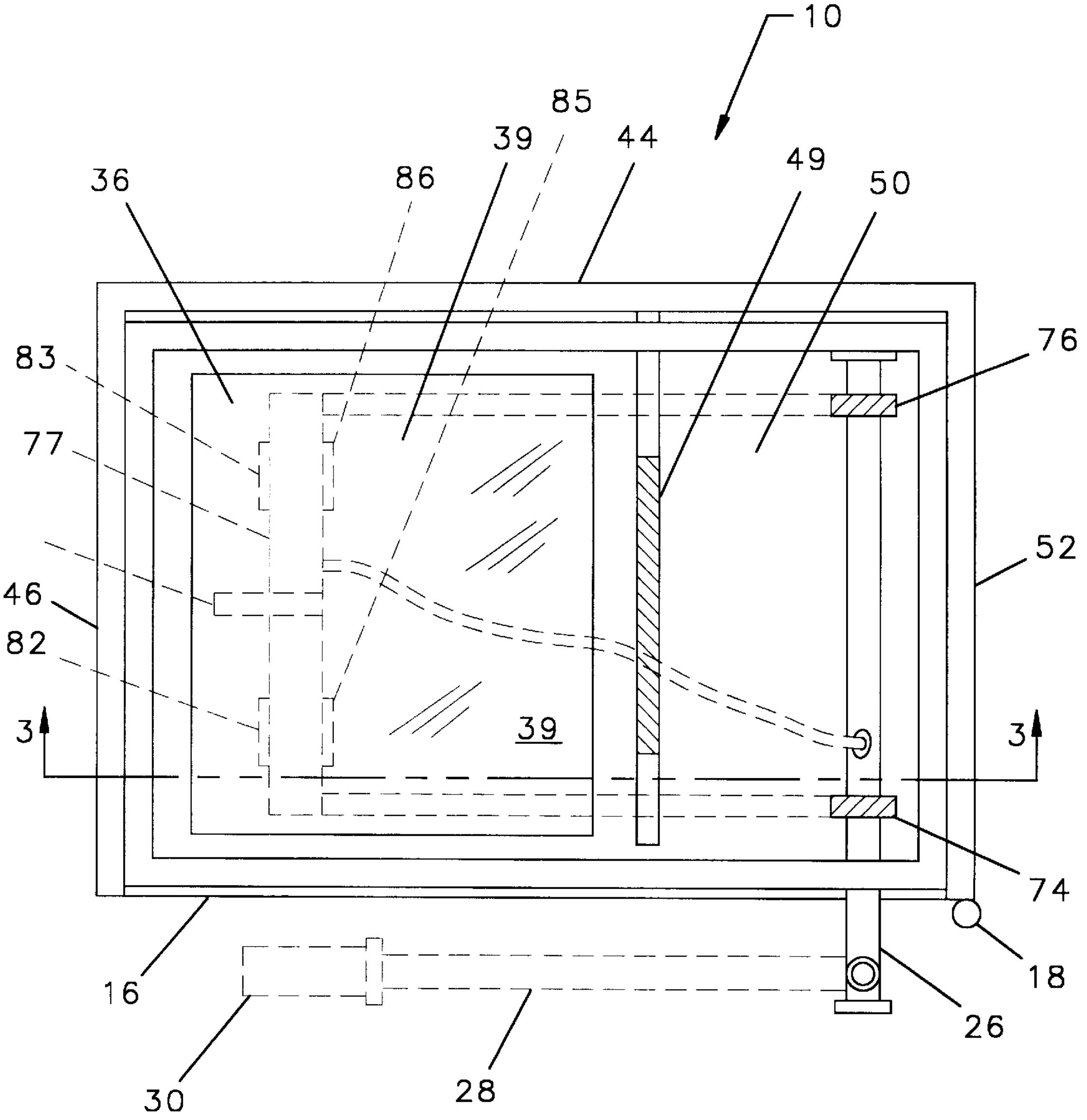

Below the magazine 36 is a cavity 45 the lower surface of which is defined by a bottom panel 47 of the enclosure 12. The cavity 45 is accessible through the slot 25. As can best be seen in FIG. 2, the magazine 36 is bounded by the rear panel 44, an end panel 46, the door 16 and a vertical inner baffle 48. Adjacent the magazine 36 is a chute 50 which is defined by the baffle 48, the rear panel 44, a second end panel 52 and the door 16. The upper end 49 of the baffle does not extend across the width of the enclosure 12 to permit greater movement of the arms as described below.

Figure 4:
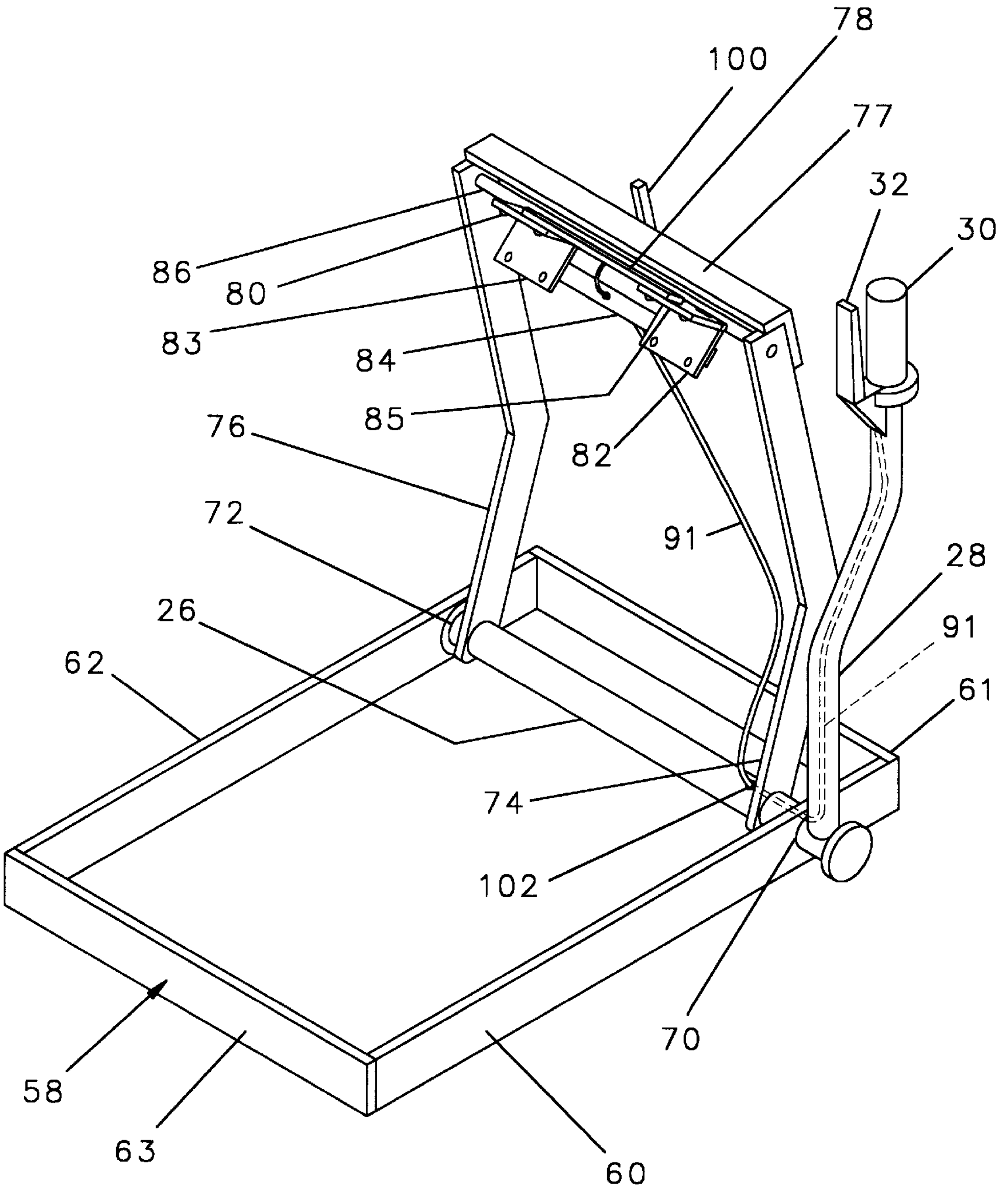
FIG. 4 is an isometric view of the arms and frame assembly for the dispensing machine shown in FIG. 1.

Referring to FIGS. 3 and 4, the shaft 26 is rotatably mounted on a frame 58 which consists of four frame members 60, 61, 62, 63. The frame 58 is slidable retained in the enclosure 12 between a first pair of upper and lower rails 64, 65 extending horizontally along end panel 46, and a second set of upper and lower rails 66, 67 extending horizontally along the second end panel 52. The shaft 26 is rotatably mounted in journals 70, 72 one on each of the opposing side members 60, 62 of the frame 58. Extending from the shaft 26 are a pair of inner arms 74, 76 orientated substantially parallel to the outer arm 28 and extending across the distal ends of inner arms 74, 76 is an angle iron member 77 which maintains rigidity to the inner arm assembly. Below the angle iron member 77 is a jaw assembly 78.

Figure 5:
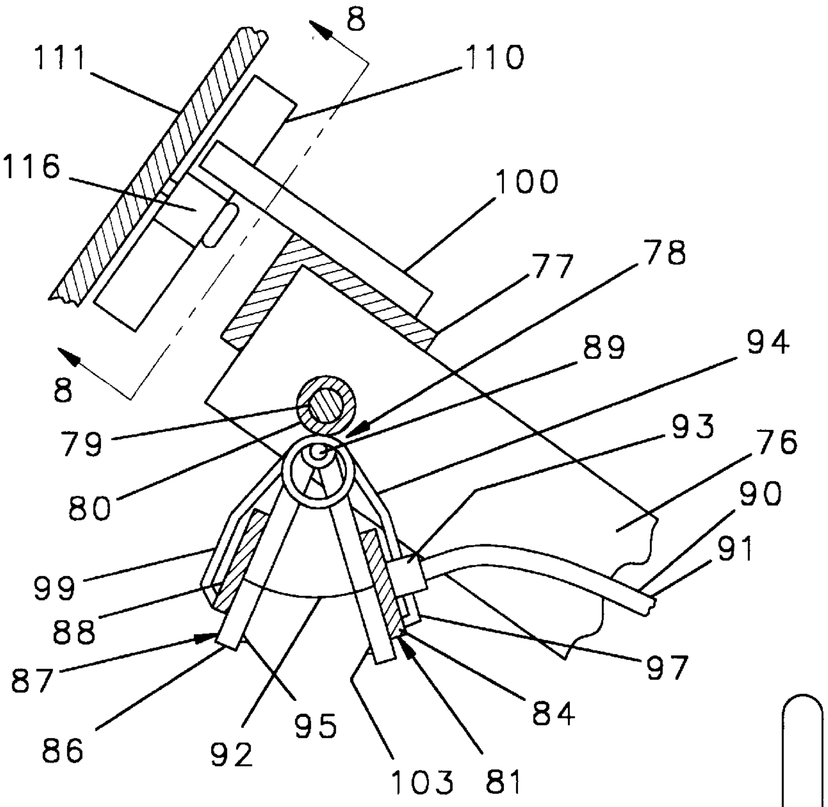
FIG. 5 is a fragmentary enlargement of a cross-section of the jaw assembly, also showing the pin in engagement with the one cycle latch for the dispensing machine of FIG. 1.

Referring to FIGS. 4 and 5, the jaw assembly 78 includes a rod 79 extending parallel to member 77 with each of the ends thereof welded to one of the inner arm 74, 76. Rotatably fitted around the rod 79 is a tubular metal sleeve 80 from which a first jaw member 81 depends. The first jaw member 81 is depicted as having two end panels 82, 83, each of which is rigidly attached to the sleeve 80 and welded across the end panels 82, 83 is a bar 84 such that the end panels 82, 83 will move as a single part. Attached by hinges 89 to the upper ends of the end panels 82, 83, are end panels 85, 86 of a second jaw member 87. Like the first jaw member 81, a metal bar 88 is welded across the end panels 85, 86 such that the second jaw member 87 moves as a single part. Extending along the inner surfaces of the second jaw member 87 are a plurality of protrusions or teeth 95—95 and extending along the inner surface of the first jaw member 81 are a plurality of recesses 103—103 which are aligned to receive the protrusions 95—95 of the second jaw member 87 when the jaws are closed. The teeth 95—95 and recesses 103—103 are suitable for gripping the plastic wrapping material 40 which enclose individual newspapers 38. When the jaw members 81–87 are compressed against an upper face 43 of a wrapped newspaper 38 the jaws 81, 87, will grip the wrapping 40 of the uppermost newspaper 38. It should also be appreciated that the sleeve 80, to which the jaws 81, 87 are attached, is rotated about the rod 79 such that the jaw assembly 78 will always extend downwardly from the rod 79 regardless of the angle of the arms 74, 76.

Centrally located along the first jaw member 81 is a mounting 93 for attaching the end of the outer sheath 90 of a conventional push pull cable 91. Within the cable 91 is a slide wire 92 and one end of which is attached to the opposing second jaw member 87 by any suitable means, such as welding. The opening of the jaws 81, 87 is limited by the movement of the slide wire 92 within the sheath 90 of the cable 91. The jaw assembly 78 further includes a torsion spring 94, one end 97 of which is welded to the first jaw member 81 and the opposing end 99 of which is welded to the second jaw member 87 and the spring 94 is biased to move the distal ends of the jaw member 81,87 away from each other. Also, positioned midway along the angle iron member 77, and extending away from the shaft 26 and parallel to the arms 74, 76, is a post 100.

Figure 6:
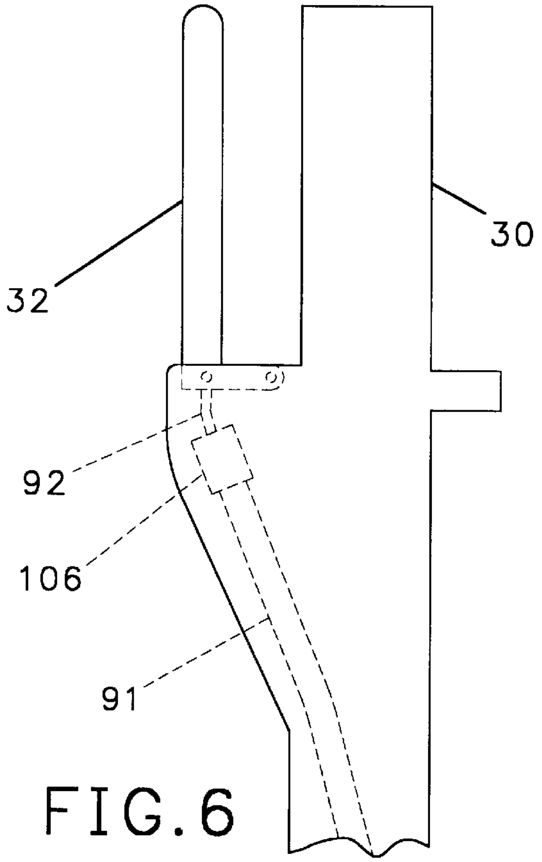
FIG. 6 is a fragmentary enlargement of the handle and lever arm, and in phantom lines, a portion of the push/pull cable.

The push pull cable 91 extends from the jaw assembly 78, into an aperture 102 in the tubular shaft 26, along the interior of the shaft 26 to the outer arm 28, and through the outer arm 28. As shown in FIG. 6 the other end of the outer sheath 90 is connected to a mounting 106 adjacent one end of the lever arm 32. The second end of the slide wire 92 is attached to the lever arm 32 such that the actuation of the lever arm 32 draws the slide wire 92 through the cable 90 causing the jaws 81, 87 to be drawn towards each other until they reach a clamp position.

As can be seen from the drawings, the tubular shaft 26 is positioned along one end of the machine, and the length of the inner arms 74, 76 is chosen, such that the jaw assembly 78 is moveable between two positions, the first of which is shown in solid lines in FIG. 3, and the second of which is shown in broken lines. In the second position shown in broken lines, the jaw assembly 78 rest upon the exposed face 43 of the upper most newspaper 38 in the magazine 36. In the first position, shown in solid lines, the jaw assembly 78 is elevated and positioned over the chute 50. Between the first position and the second position is a one cycle latch 110. As can be seen in FIG. 3 the one cycle latch is positioned on an angled surface 111, the plane of which is substantially tangent to the arc described by the distal ends of the inner arms 74, 76. The one cycle latch 110 is positioned such that the post 100 must pass through the latch 110 in order for the arms 74, 76 to be moved between the first and second positions.

Figure 7:
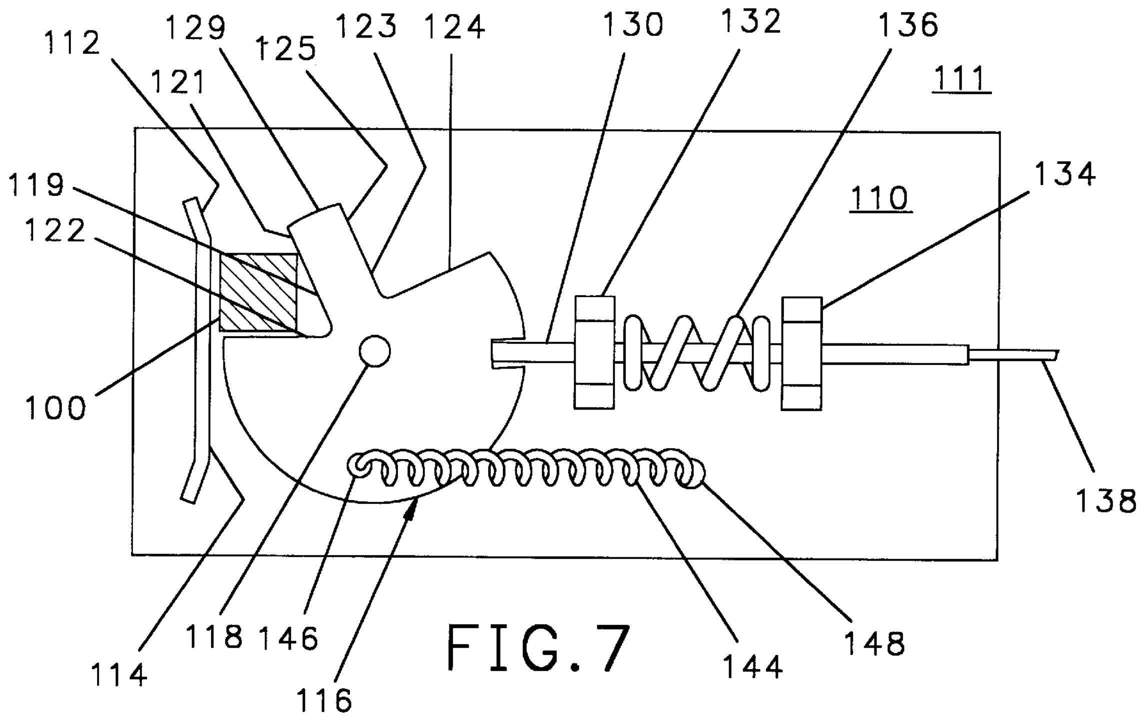
FIG. 7 is an enlarged frontal view of the one cycle latch in the latched position.
Figure 8:
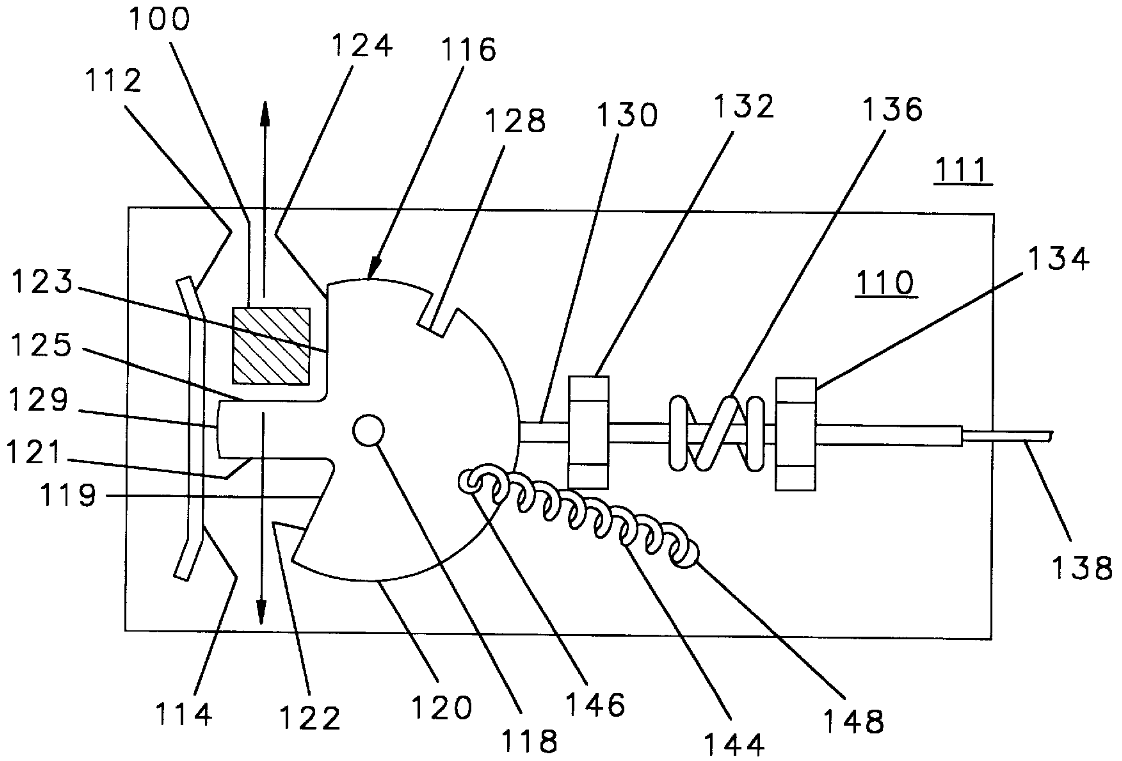
FIG. 8 is an enlarged frontal view of the one cycle latch in the unlatched position.

As can be seen in FIGS. 7 and 8, the latch 110 includes an elongate guide 112 having a surface 114 parallel to the axis of the post 100, and adjacent the guide 112 is a cam 116. The cam 116 is generally cylindrical and is rotatably mounted on a central axle 118. The cam 116 has a first indentation 119 in its outer surface 120, defined by a first and second surfaces 121, 122 respectively, and a second indentation 123 defined, by first and second surfaces 124, 125 respectively. The first and second indentations 119, 123 are spaced an angular distance of approximately 60 degrees from one another, and between the indentation 119, 123 is a finger 129. The outer surface 120 of the cam 116 is positioned against the surface 114 of the guide 112, and the guide 112 and the cam 116 are positioned such that the post 100, on the arm assembly 58 will pass between the axis 118 and the guide 112 as the distal ends of the arms 74, 76 are moved past the latch 110. To pass through the latch 110, the post 100 must fit within one of the indentations 119, 123 of the cam 116 and rotate the cam 116 as it moves between the guide 112 and the axle 118.

In addition to the indentations 120, 122 the cam 116 has a notch 128 in the outer edge thereof which is adapted to receive the distal end of an axially slidable catch pin 130. The catch pin 130 is longitudinally slidable through guides 132, 134 and biased by a spring 136 such that the distal end thereof is urged towards the cam 116 and into the notch 128 when the notch 128 is aligned with the distal end of the catch pin 130. The second end of the catch pin 130 is connected by a wire cable 138 to the coin receptor 34, which is adapted to cause the cable 138 to be momentarily withdrawn when the proper coins are deposited in the receptor, thereby withdrawing the catch pin 130 from the notch 128 of the cam 116. Coins accepted by the coin receptor 34 will be collected in a coin box 142.

The one cycle latch 110 further includes a spring 144, one end of which is connected to the cam 116 at an off center location 146 and the other end of which is mounted at a location 148 on the surface 111. The spring 144 is biased to draw the off center location 146 towards the mounting location 148, thereby urging the cam 116 to rotate to the release position shown in FIG. 8. When the cam 116 is in the release position, the distal end of the finger 129 is adjacent the surface 114 of the guide 112. Movement of the post 100 downward through latch 110, as seen in FIG. 8, will force the finger 129 downward, and rotate the cam 116 counter-clockwise. Once the post 100 has passed between the guide 112 and the axle 118, the spring 144 will rotate the cam 116 clockwise until the finger 129 is again extending toward the guide as shown in FIG. 8. Similarly, movement of the post 100 upwardly through the latch 110 will move the finger upward and rotate the cam 116 clockwise.

The notch 128 is positioned on the cam 116 such that when the arms 74, 76 are moved from their second position to their first position, and the post 100 is moved between the guide 112 and the cam 116, in an upward direction to the position shown in FIG. 7, the cam 116 will rotate until the catch pin 130 engages the notch 128. When the catch pin 130 is engaged in the notch 128, a portion of the body of the cam 116 extends between the axle 118 and the surface 114 of the guide 112, thereby preventing further movement of the post 100 between the guide 112 and the cam 116. The one cycle latch 110 is then in the latch position as shown in FIG. 7.

When proper coins are inserted into the coin receptor 34, the coin receptor will momentarily withdraw the catch pin 130, and the spring 144 will rotate the cam 116 to the release position in which the finger 129 is adjacent the surface 114 of the guide 112, as shown in FIG. 8. After coins are deposited in the receptor 34 and the cam 116 of the latch 110 rotates to the position shown in FIG. 8, the inner arms 74, 76 can be moved from the dispensing position shown in solid lines in FIG. 3 to the grasping position shown in broken lines, and the distal end of the post 100 will move along the surface 114 of the guide 112 in a downward direction. In doing so, the post 100 will apply a downward force to the finger 129 and cause the cam 116 to be rotated counter-clockwise. After the arms 74, 76 have moved the post 100 between the cam 116 and the guide 112, the spring 144 will rotate the cam 116 in a clockwise direction causing it to return to the release position shown in FIG. 8. When the arms 74, 76 are returned from the second grasping position to the first dispensing position, the post 100 will again pass between the cam 116 and the guide 112 in an upward direction this time causing the cam 116 to rotate clockwise until the notch 128 is again aligned to receive the catch pin 130 and the one cycle latch 110 is again in the latch position shown in FIG. 7. When in the latch position, the one cycle latch 110 will prevent movement of the arms 74, 76 from the first dispensing position to the second grasping position because such a movement will cause the post 100 to strike the second surface 122 of the first indentation 119 of the cam 116, which can no longer rotate because of the catch pin 130. The cam 116 and the catch pin 130 will therefore prevent movement of the post 100 between the cam 116 and the guide 112 until coins are again deposited in the receptor 34, and the catch pin 130 is again withdrawn from the notch 128.

To operate the machine, newspapers 38 are individually wrapped in a wrapping 40, of plastic or other material, and a stack of newspapers is positioned on the platform 39 in the magazine 36. The access door 16 is locked to prevent removal of newspapers 38 through the door 16. A customer seeking to purchase a newspaper will first deposit the required coins in the coin receptor 34 which are collected in the coin box 142. The receipt of the proper coins in the receptor 34 will cause the cable 138 to be momentarily retracted, thereby withdrawing the catch pin 130 from the notch 128 and causing the cam 116 to rotate to the release position. The customer next will use the handle 30 to rotate the shaft 26 and the inner arms 74,76 downward from the first dispensing position through the one cycle latch 110 to the second, grasping position. The customer will then squeeze the lever arm 32 thereby drawing the slide wire 92 through the sheathing 88 of the cable 91 and closing jaw members 81, 87. The teeth 85—85 on the jaw members 81, 87 will grip the plastic wrapping 40 on the uppermost face 43 of a newspaper 38 and retain the wrapping in the jaws 81, 87. The customer will then lift upwards on the handle 30 moving the arm 28 back to the vertical position thereby moving the inner arms 74, 76 from the second grasping position to the first dispensing position and resetting the one cycle latch 110 to the latch position. When the arms reach the first dispensing position, the newspaper retained in the jaws 81, 87 will be above the chute 50, and the customer can then release the lever arm 32 and the spring 94 will cause the jaws 81, 87 to open releasing the newspaper 38 and permitting it to fall through the chute 50. The newspaper will then drop to the lower surface 56 in the cavity 54 and can be withdrawn by the customer through the dispensing slot 25. As can be seen, the interior of the machine is not accessible to the public and is therefore tamper resistant.

To service the inner and outer arms and the jaw assembly 78, the door 16 can be opened and the frame 58 can be slid outward between the rails 64, 65, 66, 67 such that these parts can be serviced or replaced without removing the machine 10 from its location.

Figure 9:
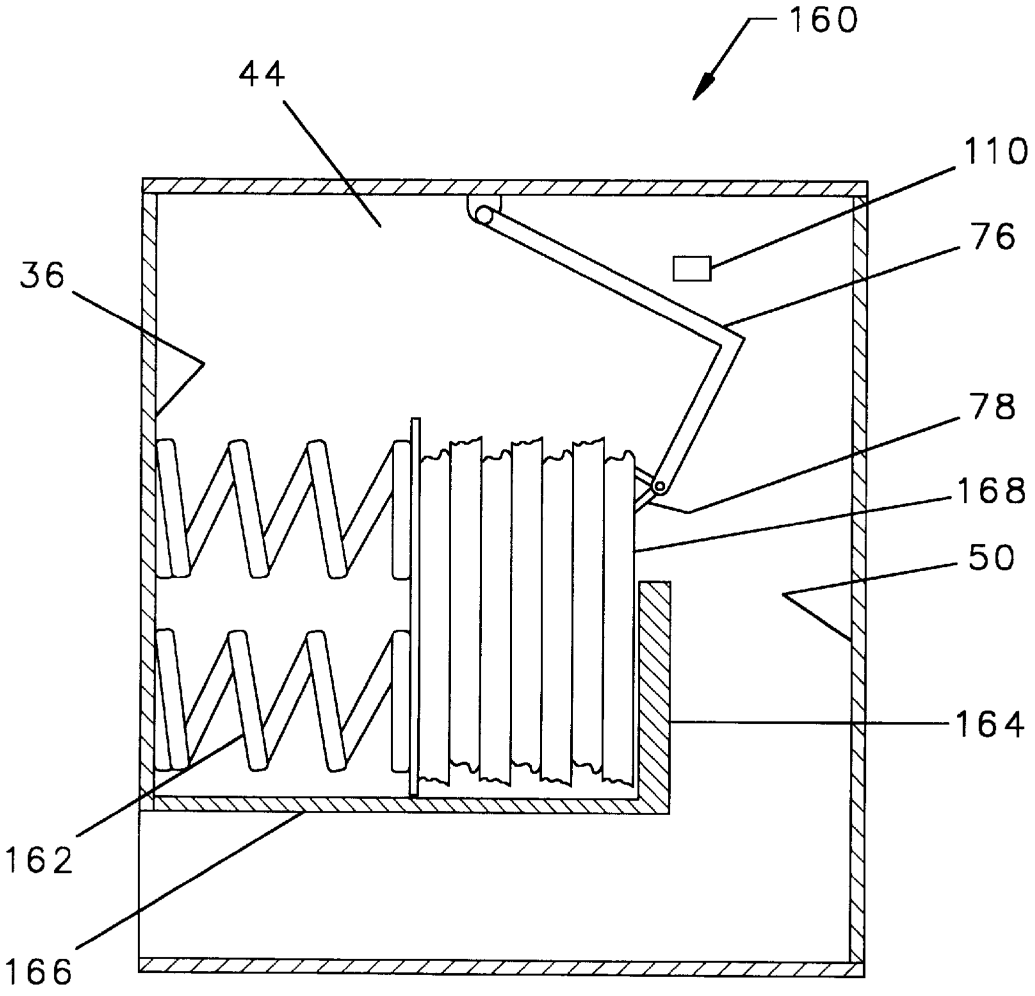
FIG. 9 is a cross-sectional view of a second embodiment of a dispensing machine in accordance with the present invention.

A second embodiment 160 of the present invention is depicted graphically in FIG. 9 in which elements which are like those of the first embodiment bear like indicia numbers. In this embodiment the newspapers 38 are aligned face to face, but with the faces positioned vertically rather than horizontally within the magazine 36. A compression spring 162 compresses the row of newspapers on end against a baffle 164. The baffle 164 extends upwardly from the floor 166 of the magazine 36 but does not extend to the upper edge of the newspapers 38 such that a portion of a face 168 of the end newspaper 38 is unobstructed and accessible.

In this embodiment, the inner arm 74, 76 are moveable from the first position, not shown, in which the jaw assembly 78 is positioned above the chute 50 to a second position in which the jaw assembly 78 is positioned against the unobstructed face 168 of the end newspaper 38, as shown. A one cycle latch 110 positioned on the rear panel 44 permits one cycle of the arms 74, 76 and jaw assembly 78 from the first position above the chute 50, to the second position where the assembly 78 jaw may grasp the end newspaper 38 in the magazine 36, and back to the first position above the chute 50.

It has therefore been disclosed a newspaper vending machine which is capable of reliably dispensing a single newspaper, regardless of its size. While two embodiments of the present invention have been disclosed it will be apparent to those skilled in the art that many changes and modifications may be made without departing from the true spirit and scope of the invention. It is therefore the purpose of the appended claims to cover all such changes and modifications that come within the true spirit and scope of the invention.

I claim:

1. A dispensing device for dispensing items having opposing faces, wherein said item are individually wrapped in a flexible wrapper, said device comprising in combination;

an enclosure having a chute, magazine means in said enclosure for retaining a plurality of items in face to face relationship with one another, one of said items having at least a partially exposed face, an inner arm having a distal end, jaw means at said distal end of said inner arm for grasping an item in said magazine, said inner arm moveable from a first position to a second position, one of said first position and said second position wherein said jaw means is over said chute, and the other of said first position and said second position wherein said jaw means is against an exposed face of an item in said magazine, means for controlling the movement of said arm from outside said enclosure, latch means having a latch position for blocking said inner arm against movement between said first and second positions, and an unlatched position whereby said inner arm is moveable from said first position to said second position and back to said first position after which said latch means is again returned to said latch position, said inner arm mounted on a rotatable shaft, and an outer arm mounted on said rotatable shaft whereby movement of said outer arm causes movement of said inner arm.

2. A dispensing device in accordance with claim 1 further comprising a lever on said outer arm, and actuating means connecting said lever to said jaw means for actuating said jaw means in response to actuation of said actuating means.

3. A dispensing device in accordance with claim 1 wherein said latch means is a one cycle latch.

4. A dispensing device in accordance with claim 1 and further comprising a coin receptor, said latch means responsive to said coin receptor whereby said latch means is unlatch in response to a coin deposited into said coin receptor.

5. A dispensing device in accordance with claim 1 wherein said jaw means will grasp a flexible wrapper on an item in said magazine.

6. A dispensing device for dispensing items having opposing faces, said device comprising in combination;

an enclosure having a chute, magazine means in said enclosure for retaining a plurality of items in face to face relationship with one another, an inner arm, means on said inner arm for grasping an item in said magazine, said inner arm moveable from a first position to a second position, one of said first position and said second position wherein said means for grasping is over said chute, and the other of said first position and said second position wherein said means for grasping is against an item in said magazine, latch means having a latch position for preventing said means for grasping from grasping an item in said magazine and an unlatched position whereby said means for grasping is not prevented from grasping an item in said magazine, an outer arm moveable from a first position to a second position, means connecting said inner arm to said outer arm for moving said inner arm in response to movement of said outer arm, a lever on said outer arm, and actuating means connecting said lever to said means for grasping for actuating said means for grasping in response to actuation of said actuating means.

7. A dispensing device in accordance with claim 6 wherein said latch means is a one cycle latch.

8. A dispensing device in accordance with claim 6 and further comprising a coin receptor, said latch means responsive to said coin receptor whereby said latch means is unlatch in response to coins deposited into said coin receptor.

9. A dispensing device in accordance with claim 6 wherein said means connecting is a rotatable shaft.

10. A dispensing device for dispensing items having opposing faces, said device comprising in combination:

an enclosure having a chute, magazine means in said enclosure for retaining a plurality of items in face to face relationship with one another, an inner arm, means on said inner arm for grasping an item in said magazine, said inner arm movable from a first position to a second position, one of said first position and said second position wherein said means for grasping is over said chute, and the other of said first position and said second position wherein said means for grasping is against an item in said magazine, first control means for an operator to control movement of said inner arm, said first control means positioned outside said enclosure, a second control means for an operator to control said means for grasping, said second control means positioned outside said enclosure, a window in said enclosure through which an operator can view the operation of said inner arm and said means for grasping while operating said first control means and said second control means.

* * * * *